(12) United States Patent
Burczyk et al.

(10) Patent No.: US 8,794,664 B2
(45) Date of Patent: Aug. 5, 2014

(54) SAFETY BELT FOR A VEHICLE

(75) Inventors: Christian Burczyk, Stuttgart (DE);
Hakan Ipek, Schoenaich (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 13/704,548

(22) PCT Filed: May 17, 2011

(86) PCT No.: PCT/EP2011/002438
§ 371 (c)(1),
(2), (4) Date: Jan. 7, 2013

(87) PCT Pub. No.: WO2011/157336
PCT Pub. Date: Dec. 22, 2011

(65) Prior Publication Data
US 2013/0106083 A1     May 2, 2013

(30) Foreign Application Priority Data
Jun. 15, 2010   (DE) .......................... 10 2010 023 875

(51) Int. Cl.
*B60R 21/18*     (2006.01)
*B60R 21/231*    (2011.01)
*B60R 22/16*     (2006.01)
*B60R 22/28*     (2006.01)

(52) U.S. Cl.
CPC .............. *B60R 21/18* (2013.01); *B60R 21/231* (2013.01); *B60R 22/16* (2013.01); *B60R 2022/282* (2013.01)
USPC ....................................................... 280/733

(58) Field of Classification Search
CPC ...... B60R 21/18; B60R 21/231; B60R 22/16; B60R 2022/282
USPC ......................... 280/733, 801.1; 297/468, 471
See application file for complete search history.

(56) References Cited

U.S. PATENT DOCUMENTS 3,866,940 A *  2/1975  Lewis ........................... 280/733
3,929,205 A    12/1975  Takada et al.
(Continued)

FOREIGN PATENT DOCUMENTS

DE    24 00 992 A    1/1974
DE    91 03 845 U1   7/1991
(Continued)

OTHER PUBLICATIONS

Corresponding International Search Report with English Translation dated Aug. 23, 2011 (four (4) pages).

(Continued)

*Primary Examiner* — Paul N Dickson
*Assistant Examiner* — Timothy Wilhelm
(74) *Attorney, Agent, or Firm* — Crowell & Moring LLP

(57) ABSTRACT

A seat belt for a vehicle includes a belt webbing with several belt webbing layers and, in a shoulder belt region and a lap belt region, at least one belt interior located between at least two belt webbing layers and to which a gas can be applied. The belt webbing is routed through an opening of a latch plate that can be inserted into a buckle, by means of which latch plate the belt webbing is, if the seat belt is fastened, deflected at a lower deflection point in a transitional region from the lap belt region to the shoulder belt region. A gas passage connecting at least two sections of the belt interior is provided at the lower deflection point between the at least two belt webbing layers. The gas passage is in the form of a tube that is flexible at least in the radial direction.

12 Claims, 2 Drawing Sheets

(56) References Cited

U.S. PATENT DOCUMENTS

| | | | | |
|---|---|---|---|---|
| 3,975,258 | A | * | 8/1976 | Fox .................. 280/733 |
| 5,474,326 | A | * | 12/1995 | Cho .................. 280/733 |
| 6,007,092 | A | * | 12/1999 | Martz ................ 280/733 |
| 6,340,173 | B1 | * | 1/2002 | Specht ............... 280/733 |
| 6,705,244 | B1 | * | 3/2004 | Berger et al. ........ 112/475.06 |
| 7,481,452 | B2 | * | 1/2009 | Itoga et al. .......... 280/733 |
| 2007/0096535 | A1 | | 5/2007 | Lundell et al. |

FOREIGN PATENT DOCUMENTS

| | | |
|---|---|---|
| DE | 198 21 996 A1 | 11/1999 |
| DE | 198 57 517 A1 | 6/2000 |
| DE | 199 32 940 A1 | 1/2001 |
| DE | 10 2004 006 843 A1 | 9/2005 |
| EP | 1 053 133 B1 | 9/2001 |
| JP | 2006-96168 A | 4/2006 |
| WO | WO 2008/120417 A1 | 10/2008 |

OTHER PUBLICATIONS

German-language Written Opinion dated Aug. 23, 2011(PCT/ISA/237) (six (6) pages).

* cited by examiner

SAFETY BELT FOR A VEHICLE

BACKGROUND AND SUMMARY OF THE INVENTION

Exemplary embodiments of the present invention relate to a seat belt for a vehicle, comprising a belt webbing that comprises several belt webbing layers and, in a shoulder belt region and a lap belt region, at least one belt interior located between at least two belt webbing layers and to which a gas can be applied, wherein the belt webbing is guided through an opening of a latch plate that can be inserted into a buckle, by means of which latch plate the belt webbing is, if the seat belt is fastened, deflected at a lower deflection point in a transitional region from the lap belt region to the shoulder belt region, and wherein a gas passage connecting at least two sections of the belt interior is provided at the lower deflection point between the at least two belt webbing layers.

German Patent Document DE 91 03 845 U1 discloses a restraint device for occupants. The restraint device comprises a seat belt with a buckle and a deflection fitting. The seat belt is designed as a flat tube and coupled to a device by means of which the tube, in an accident-related sudden deceleration of the vehicle equipped therewith, can be inflated within fractions of a second with a gas, turning it into a tube with a substantially circular cross-section.

German Patent Document DE 198 57 517 A1 discloses an inflatable belt webbing for a seat belt made of a two-layered woven fabric. A webbing width of the fabric is divided into three parts of approximately equal width, these being a left-hand outer part, a central part and a right-hand outer part, the warp threads of the parts differing in thickness. The outer parts and the inner part are folded in such a way that they form a flattened Z. In two folding zones, at least one tear-open thread is woven or sewn into the fabric, the tear-open thread breaking under a presettable breaking load, so that the individual fabric layers move in preset directions and the belt webbing is opened by means of a blown-in explosion gas to form an inflated belt bag. A gas delivery hose is provided to apply gas to the belt webbing, the gas delivery device is placed in the belt webbing between darts. For inflation, the belt webbing is supplied with the explosion gas by means of the gas delivery hose.

European Patent Document EP 1 053 133 B1 describes a three-point belt with shoulder and lap belt parts of a belt webbing, which are inflatable at least in the shoulder belt region. At a deflection point, the seat belt is provided with an insertion part that can be inserted into a buckle, the belt webbing being deflected in a transitional region from the lap belt part to the shoulder belt part at the deflection point if the seat belt is fastened. In the region of the insertion part, the belt webbing is provided at the deflection point with a gas passage for establishing a gas flow connection between the belt interiors of the shoulder belt part and the lap belt part. An opening cross-section of the gas passage is smaller than the cross-section of a filled belt interior, which can be filled continuously and extends in the belt webbing that forms the shoulder and lap belt parts as well as in the transitional region. At least in the belt interior of the transitional region guided around the deflection point, the gas passage forms a radially reinforced gas line via the opening cross-section of which the interiors of the shoulder belt part and the lap belt part can be inflated. The gas passage consists of a tubular piece having a relatively high rigidity in the radial direction, so that the opening cross-section formed by the gas passage does not collapse as the belt webbing is deflected about the deflection point. The seat belt further comprises a gas feed in the region of an end of the lap belt part which is opposite the transitional region.

Exemplary embodiments of the present invention are directed to providing an improved seat belt for a vehicle.

The seat belt for a vehicle comprises a belt webbing having several belt webbing layers and, in a shoulder belt region and a lap belt region, at least one belt interior that is located between at least two belt webbing layers and to which a gas can be applied, wherein the belt webbing is guided through a recess of a latch plate that can be inserted into a buckle, by means of which latch plate the belt webbing is, if the seat belt is fastened, deflected at a lower deflection point in a transitional region from the lap belt region to the shoulder belt region, and wherein a gas passage connecting at least two sections of the belt interior is provided at the lower deflection point between the at least two belt webbing layers.

The two sections of the belt interior are formed by the deflection of the belt webbing in the region of the latch plate and the resulting tensile and compressive forces.

According to the invention, the gas passage is represented by a tube which is flexible, i.e., collapsible, at least in the radial direction.

If gas is applied to the belt interiors in order to increase a surface area of the belt webbing, which happens if the vehicle collides with an obstacle, the tube forms an open flow cross-section due to the internal pressure acting in the interior of the tube. In this way, even the shoulder region of the seat belt can be filled with gas from a gas generator located at a lower mounting point of the belt webbing, even though the belt webbing is deflected at the lower deflection point. This results in an optimized gas filling of the belt webbing. The gas may be, for example, air or reaction gases generated in a pyrotechnic gas generator and by the ignition of the fuel charge.

In a particularly preferred further development of the invention, the tube is compressed flat between the belt webbing layers if no gas is applied to the belt webbing. Due to the fact that the gas passage is a collapsible tube lying flat between the belt webbing layers, the belt webbing is flexible and can be paid out and retracted with little effort. The belt webbing can further be easily moved within the latch plate. Due to the flexible design of the tube and therefore of the belt webbing, the belt webbing can further be optimally positioned on the vehicle occupant, so that a maximum protection of the vehicle occupant is always ensured. In addition to advantageous haptics, the flexibility of the belt webbing and the simple pay-out and retraction thereof result in great comfort for the vehicle occupant.

The tube is further preferably designed to be seamless, improving its tightness against radially escaping gas. According to a further development of the invention, the tube is woven seamlessly using generally known methods. The fabric is preferably a synthetic fiber fabric, in particular a polyester yarn fabric, which offers a particularly high stability. As the tube is made of a woven fabric, it can be introduced into the belt webbing in a flat form in a particularly simple way.

An inside of the tube is then preferably coated with a fluid-impermeable layer, in particular latex of silicone. This makes the tube fluid-tight. As a result, the connection of the belt interior between the lap belt region and the shoulder belt region is not broken in the filling process, because a gas escape from the tube in the radial direction is avoided.

In order to avoid a slippage of the tube within the belt webbing while the seat belt is fastened and unfastened and in the fastened state thereof, the tube is secured to at least one of the belt webbing layers according to a further development of the invention. This may be carried out by bonding the tube to the inside of the respective belt webbing layer. The resulting adhesive seam preferably has a small width dimension, allowing an optimized unfolding of the tube.

If the latch plate is inserted into the buckle and the belt webbing is paid out to its minimum extent, the tube preferably extends no further than an upper deflection point. This means that the tube always extends maximally to the upper deflection point if the seat belt is fastened, this deflection point being preferably located in the upper region next to the vehicle occupant or the vehicle seat. In addition, the inflatable belt interior in the shoulder belt region likewise extends no further than the upper deflection point at minimum pay-out length. In this way, an inflation of the belt webbing behind the upper deflection point is avoided. This in turn minimizes the gas quantity required to fill the belt interiors. In addition, any deformation of, damage to or loosening of paneling within the vehicle, behind which the belt webbing runs, is avoided, so that the risk of injury to the vehicle occupant(s) is minimized.

In a particularly preferred further development of the invention, the tube is directly coupled to the gas generator, thereby forming a so-called gas lance. This advantageously results in a further improvement of the unfolding of the tube and the belt webbing, in particular in a shortening of the time leading to the unfolding.

The width of the belt webbing is preferably divided into several parts of approximately equal width, the belt webbing being folded once or several times parallel to its longitudinal dimension. In the region of the interior folded layers, the belt webbing is preferably woven thinner than in the region of the two outer folded layers. As a result, the belt webbing has an advantageously minimal thickness, a high flexibility and a low weight.

The folded layers are joined to one another by tear-open threads that break as the gas is applied to the belt webbing, followed by the unfolding of the belt webbing. During a collision of the vehicle, a surface area of the belt webbing is therefore increased as a result of its unfolding, thereby minimizing the load acting on the vehicle occupant.

The tear-open threads are inserted at the edges into the folded layers of the belt webbing in such a way that they form seams extending in the longitudinal direction of the belt webbing, these seams breaking when the gas acts on the belt interiors, i.e., when a resulting predetermined tensile load is exceeded. By the tear-open threads, the individual folded layers of the belt webbing are securely joined at the edges. The tear-open threads are inserted into the belt webbing in such a way that the latter maintains its flat shape in use. Furthermore, a defined unfolding of the belt webbing under the action of the gas is obtainable. In combination with the gas-tight design of the gas passage, an internal pressure within the gas passage can be maintained for a longer time, thereby facilitating an optimized and complete unfolding of the belt webbing.

In a particularly preferred variant, the width of the belt webbing is divided into three parts of approximately equal width, the belt webbing being folded twice parallel to its longitudinal dimension in such a way that it has a flattened Z-shape. After the unfolding of the belt webbing, a contact surface of the belt webbing on the vehicle occupant becomes almost three times as large as in the folded state, so that the force acting on the vehicle occupant is reduced in the region of the unfolding of the belt webbing.

BRIEF DESCRIPTION OF THE DRAWING FIGURES

Embodiments of the invention are explained in greater detail below with reference to drawings.

Of the drawings.

Corresponding parts are identified by the same reference numbers in all figures.

DETAILED DESCRIPTION

Figure 1:
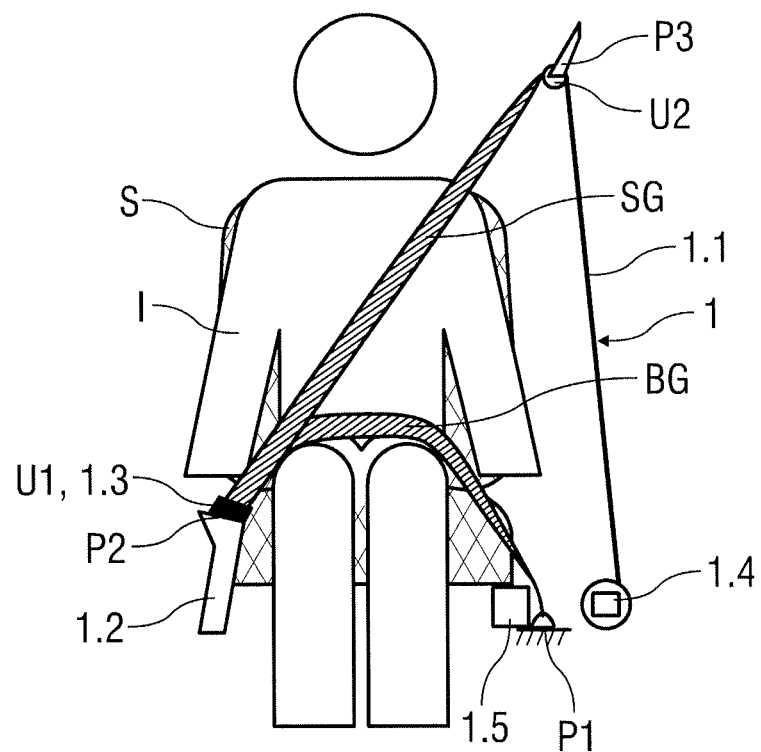
FIG. 1 is a diagrammatic representation of a vehicle occupant on a vehicle seat and of a seat belt according to the invention.

In FIG. 1, a vehicle occupant I is shown on a vehicle seat S, the vehicle occupant I wearing a seat belt 1 according to the invention. The seat belt 1 is a so-called three-point belt, which ties the vehicle occupant to a vehicle body at three points P1 to P2.

A first point P1 is located in the lower region next to the vehicle seat S, in particular on a B-post of the vehicle. At this first point P1, a belt webbing 1.1 of the seat belt 1 is secured to the vehicle body.

From this first point P1, the belt webbing 1.1 is routed via a lap region of the vehicle occupant I to a second point P2, which is represented by a buckle 1.2 secured to the vehicle body and preferably including a tensioner not shown in the drawing. A so-called latch plate 1.3 engages the buckle 1.2 or is tied thereto. The region of the belt webbing 1.1 running across the lap region of the vehicle occupant I is hereinafter referred to as lap belt region BG and is provided for the restraint of the lap region of the vehicle occupant I.

The belt webbing 1.1 is routed through an opening in the latch plate 1.3 which is not shown in the drawing and deflected. The latch plate 1.3 forms a lower deflection point U1.

From the lower deflection point U1, the belt webbing 1.1 is routed across an upper body region of the vehicle occupant I to an upper deflection point U2, which forms the third point P3. The section of the belt webbing 1.1 between the second point P2 and the third point P3 is hereinafter referred to as shoulder belt region SG and is provided for the restraint of the upper body region of the vehicle occupant I.

The belt webbing 1.1 is displaceably arranged in the latch plate 1.3 to adapt a length of the lap belt region BG and the shoulder belt region SG individually to the size of the body of the vehicle occupant I.

The upper deflection point U2 is preferably vertically adjustable at the B-post of the vehicle, so that the height of the seat belt 1 can be individually adjusted to the size of the body of the vehicle occupant I.

From the upper deflection point U2, the belt webbing 1.1 is routed to a belt retractor 1.4, which is preferably secured in the lower region of the B-post of the vehicle. The belt retractor 1.4 is provided to retract the belt webbing 1.1 of the seat belt 1 when not in use and to tension the belt webbing 1.1 at the body of the vehicle occupant I when the seat belt 1 is fastened. The belt retractor 1.4 preferably includes a so-called retractor tensioner not shown in the drawing, by means of which the belt webbing 1.1 can, if the vehicle collides with an obstacle, be tensioned in such a way that the vehicle occupant I is optimally positioned in the vehicle seat S, resulting in an optimized restraint of the vehicle occupant I.

In order to reduce a loading of the vehicle occupant I if the vehicle collides with an obstacle, the belt webbing 1.1 is designed as a two-layer, twice folded and inflatable belt webbing which, on detecting a collision or an imminent, unavoidable collision, can be filled with a gas in advance and then unfolds. For this purpose, a gas generator 1.5 is provided, by means of which a belt interior G formed between the belt webbing layers 1.1.1 and 1.1.2 of the belt webbing 1.1, which is shown in greater detail in FIG. 2, can be filled with gas.

Figure 2A:
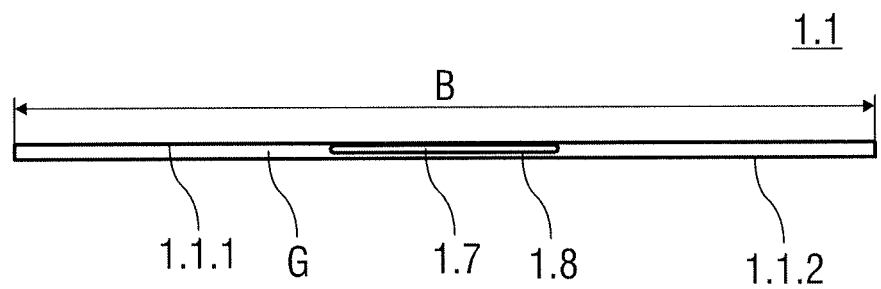
FIG. 2A is a diagrammatic sectional view of a belt webbing of the seat belt from FIG. 1 in the unfolded state with a gas passage placed flat between two belt webbing layers.

FIG. 2A is a sectional view of the belt webbing 1.1. The belt webbing 1.1 has two belt webbing layers 1.1.1 and 1.1.2.

In the production process, the belt webbing 1.1 is preferably first formed from one fabric layer, which is then folded once and the edge regions of which are joined to one another in such a way that the belt webbing 1.1 becomes tubular. To join the belt webbing layers 1.1.1 and 1.1.2, they are, for example, bonded, sewn and/or woven to each other. A belt interior G is formed between the belt webbing layers 1.1.1 and 1.1.2.

The fabric layer is formed from a woven fabric that is woven from plastic yarns. Preferred plastics for this purpose are polyester and/or nylon. The fabric is characterised by a long service life and high mechanical and tensile strength as well as high flexibility, so that a maximum surface area of the belt webbing 1.1 is in contact with the vehicle occupant I.

To produce the tubular belt webbing 1.1, the belt 1 may, as an alternative to folding, be made of two fabric layers which are placed on top of each other and joined to each other in their edge regions. Once again, the fabric layers may be bonded, sewn and/or woven to each other.

To reduce gas escape from the belt webbing 1.1, the belt webbing layers 1.1.1 and 1.1.2 are coated with a sealing material at least on the inside, i.e., the side facing the belt interior G. This sealing material may be, for example, silicone or latex.

The belt webbing 1.1 is folded several times to minimize a loading of the vehicle occupant I if the vehicle collides with an obstacle.

Figure 2B:
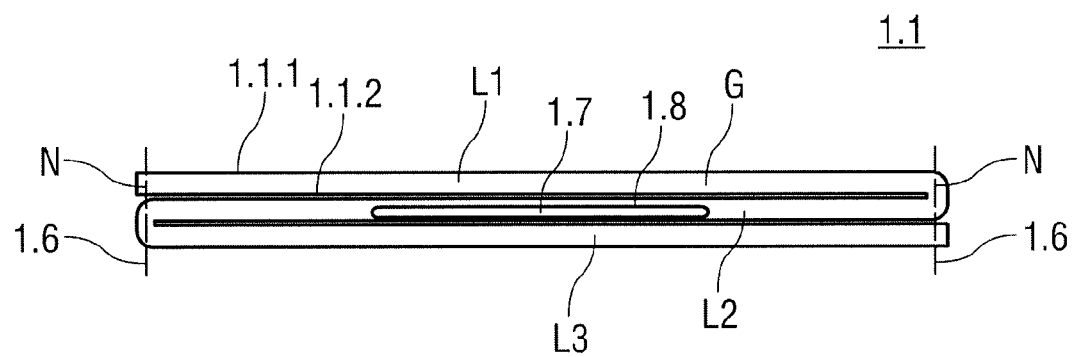
FIG. 2B is a diagrammatic sectional view of a belt webbing of the seat belt from FIG. 2A in the folded state.

FIG. 2B shows the belt webbing 1.1 with a double fold.

If the vehicle collides with an obstacle, several folded layers L1 to L3 of the belt webbing 1.1 unfold as the gas is applied to the belt interior G, so that a surface area of the belt webbing 1.1 is increased when restraining the vehicle occupant I.

To produce the folded layers L1 to L3, the belt webbing 1.1 is folded twice parallel to its longitudinal dimension. Viewed from the front, the belt 1 has a flattened Z-shape. For this purpose, a width of the belt webbing 1.1 is divided into three parts of approximately equal width. A first outer part of the belt webbing 1.1 is turned over in such a way that the first outer part lies below a central part of the belt webbing 1.1. A second outer part is placed on the central part after folding, forming three folded layers L1 to L3.

The folded layers L1 to L3 are joined to one another at the edges by woven or sewn tear-open threads 1.6 to fix the folded arrangement. Each of the tear-open threads 1.6 forms a seam N at the edges.

Figure 3:
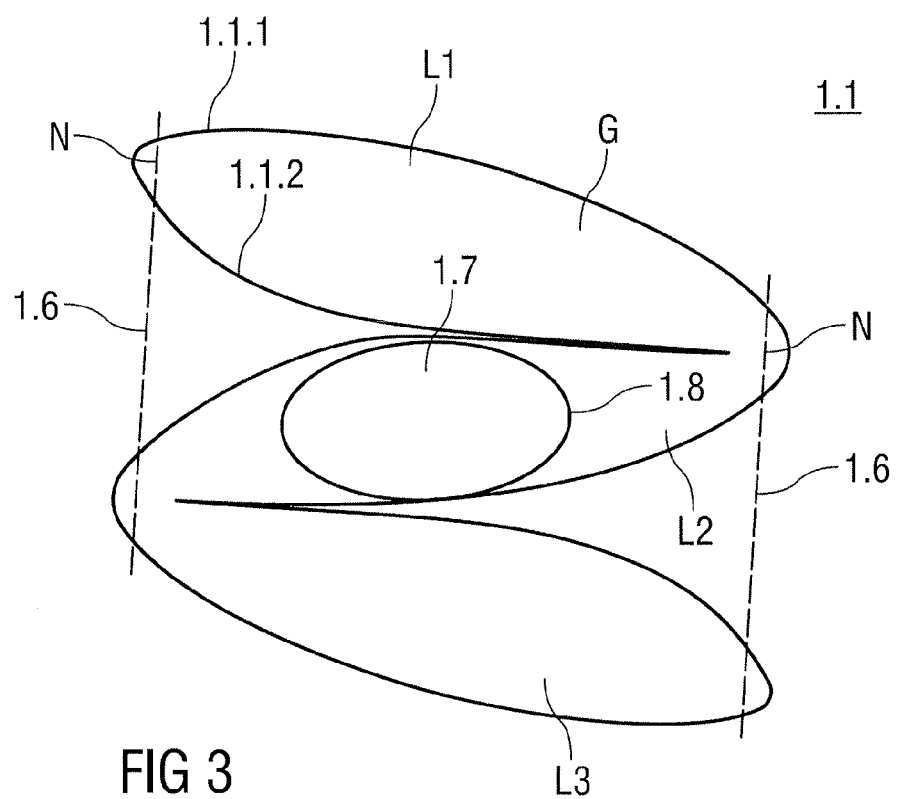
FIG. 3 is a diagrammatic sectional view of the belt webbing from FIG. 2B in a state in which gas is applied to the gas passage.

When the gas is applied to the belt interior G, the belt interior G expands as illustrated in greater detail in FIG. 3, so that the tear-open threads 1.6 break in a defined manner when a preset deformation of the belt webbing 1.1 is reached, thereby destroying the seams N. The preset deformation of the belt webbing 1.1 occurs on reaching a preset minimum pressure in the belt interior G, and due to the deformation of the belt webbing 1.1 tensile forces act on the tear-open threads 1.6, thereby breaking the tear-open threads 1.6. As a result, the belt webbing 1.1 unfolds owing to the opening of the folded layers of the belt webbing 1.1.

In order to provide maximum protection for the vehicle occupant I, the belt webbing 1.1 is folded in the shoulder belt region SG and the lap belt region BG. In embodiments of the seat belt 1 which are not illustrated, the belt webbing 1.1 is folded in the shoulder belt region SG or in the lap belt region BG.

The region where the belt webbing 1.1 is folded extends no further than the upper deflection point U2, so that an unfolding of the belt webbing 1.1 in the region between the upper deflection point U2 and the belt retractor 1.4 and consequently an undefined unfolding in the shoulder belt region SG are avoided. The folded and therefore region of the belt webbing 1.1 that can be unfolded extends, if the latch plate 1.3 is inserted into the buckle 1.2 and at a minimum pay-out length of the belt webbing 1.1, no further than the upper deflection point U2. The minimum pay-out length of the belt webbing 1.1 occurs in a situation in which the seat belt 1 is fastened while the vehicle seat S is empty, i.e. while the vehicle occupant I does not sit on the vehicle seat S.

To feed the gas into the belt interior G, the belt interior G is connected to the gas generator 1.5, which, on detecting a collision or earlier, feeds the gas into the belt interior G. In order to obtain an even and complete unfolding of the belt webbing 1.1 in all regions, the preset minimum pressure has to be reached in all regions, i.e., in the whole of the belt interior G.

The gas generator 1.5 is located at the mounting point of the belt webbing 1.1, i.e., at P1. To unfold the belt webbing 1.1, the gas is fed by the gas generator 1.5 through the belt interior G as far as the shoulder belt region SG of the belt webbing 1.1.

To enable the gas to flow at the lower deflection point U1, i.e., in the region where the belt webbing 1.1 is deflected at the latch plate 1.3, a gas passage 1.7 is provided in the region of the lower deflection point U1 within the belt interior G. This gas passage 1.7 connects the belt interior G, which is divided by the deflection and by the tensile load acting on the belt webbing 1.1 by means of the latch plate 1.3. This means that the sections of the belt interior G in the shoulder belt region SG and the lap belt region BG are connected to each other.

The gas passage 1.7 is represented by a tube 1.8 that is flexible in the radial direction and which lies flat between the belt webbing layers 1.1.1, 1.1.2. In the illustrated embodiment of the belt webbing 1.1, the gas passage 1.7 is installed in the middle between the edge regions of the unfolded belt webbing 1.1. When the belt webbing 1.1 is folded, the gas passage therefore lies in its central part.

The tube 1.8 forming the gas passage 1.7 is made of a synthetic fiber fabric and seamless, and a layer of silicone and/or latex, which is impermeable to fluids, is applied to the inside of the tube 1.8. This makes the tube 1.8 very flexible and fluid-tight and enables it to be inserted extremely flat into the belt webbing 1.1.

If the gas is applied to the belt interior G, the gas passage 1.7 unfolds in such a way that a free flow cross-section is created within the gas passage 1.7.

FIG. 3 shows the belt webbing 1.1 in a state in which gas has been applied to the gas passage 1.7 and to the belt interior G, but the tear-open threads 1.6 are not broken. If the pressure within the belt interior G and the gas passage 1.7 is increased further, the folded regions of the belt webbing 1.1 expand further in a manner not shown in the drawing; this is accompanied by an increased tensile loading of the tear-open threads 1.6, so that the tear-open threads 1.6 break and the folded layers of the belt webbing 1.1 unfold.

As a result of the provision of the gas passage 1.7 in the belt webbing 1.1 in the region of the lower deflection point U1, the gas fed by the gas generator 1.5 into the belt interior G can also be fed into the shoulder belt region SG of the belt interior G, resulting in an optimized and defined filling of the belt interior G both in the lap belt region BG and in the shoulder belt region SG of the seat belt 1.

To prevent a slippage of the gas passage 1.7 within the belt webbing 1.1, the gas passage 1.7 is secured to the first belt webbing layer 1.1.1 in the central region of the belt webbing 1.1. It is secured by bonding, the joint surface area between the gas passage 1.7 and the first belt webbing layer 1.1.1 being kept as small as possible in order to obtain an unaffected unfolding of the gas passage 1.7 and the belt interior G.

In one variant of the seat belt 1, the gas passage 1.7 extends from the gas generator 1.5 into the shoulder belt region SG of the belt webbing 1.1. The gas passage 1.7 terminates within the belt interior G in the shoulder belt region SG, so that the gas can flow from an end-side opening of the gas passage 1.7 into the belt interior G in the shoulder belt region SG. In this case, the gas generator 1.5 preferably has several gas outlets not shown in the drawing, at least one of them terminating into the gas passage 1.7 and at least one further terminating into the belt interior G in the lap belt region BG. In this way, both the shoulder belt region SG and the lap belt region BG of the belt interior can be supplied with gas in an optimum manner.

The gas passage 1.7 likewise extends no further than the upper deflection point U2, so that an "inflation" of the belt webbing 1.1 between the upper deflection point U2 and the belt retractor 1.4 is avoided.

In embodiments of the seat belt 1 that are not shown in the drawings, the belt webbing 1.1 may, in deviation from the two-layer, twice-folded design, have another number of layers and different folding arrangements.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A seat belt for a vehicle, comprising:
    a belt webbing comprising several belt webbing layers and, in a shoulder belt region and a lap belt region, at least one belt interior located between at least two belt webbing layers and configured to receive a gas from a gas generator,
    wherein the belt webbing is routed through an opening of a latch plate that is insertable into a buckle, by means of the latch plate the belt webbing is, if the seat belt is fastened, deflected at a lower deflection point in a transitional region from the lap belt region to the shoulder belt region,
    wherein the seat belt further comprises a gas passage connecting at least two sections of the belt interior at the lower deflection point between the at least two belt webbing layers,
    wherein the gas passage is a tube that is flexible at least in a radial direction, and
    wherein the belt webbing and gas passage are arranged with respect to each other and with respect to the gas generator so that the gas from the gas generator fills an interior of the tube and the at least one belt interior surrounding the tube with the gas.

2. The seat belt according to claim 1, wherein the tube is compressed flat between the belt webbing layers if no gas is applied to the belt webbing.

3. The seat belt according to claim 1, wherein the tube is seamless.

4. The seat belt according to claim 1, wherein the tube is secured to at least one of the belt webbing layers.

5. The seat belt according to claim 1, wherein if the latch plate is inserted into the buckle and at a minimum pay-out length the tube extends no further than an upper deflection point.

6. The seat belt according to claim 1, wherein a width of the belt webbing is divided into several parts of approximately equal width, the belt webbing being folded once or several times parallel to its longitudinal dimension.

7. The seat belt according to claim 6, wherein the width of the belt webbing is divided into three parts of approximately equal width, the belt webbing being folded twice parallel to its longitudinal dimension in such a way that it has a flattened Z-shape.

8. The seat belt according to claim 6, wherein the folded layers of the belt webbing are joined to one another at least at the edges by seams extending in a longitudinal direction of the belt webbing.

9. The seat belt according to claim 8, wherein the seams are tear-open threads that break if the gas is applied to the belt interiors.

10. The seat belt according to claim 1, wherein the tube is made of a fluid-tight woven fabric.

11. The seat belt according to claim 1, wherein the gas generator has a first gas outlet terminating in the tube and a second outlet terminating in the at least one belt interior.

12. The seat belt according to claim 1, wherein the tube extends from the gas generator into the shoulder belt region so that the gas flows from an end of the tube arranged in the shoulder belt region into the at least one belt interior in the shoulder belt region.

* * * * *